United States Patent Office 3,349,391
Patented Oct. 24, 1967

3,349,391
COUNTING TYPE ANALOGUE-TO-DIGITAL CONVERTERS
Naokazu Kimura, Katsuta-shi, Japan, assignor to Hitachi, Ltd., Tokyo, Japan, a corporation of Japan
Filed Oct. 1, 1964, Ser. No. 400,763
6 Claims. (Cl. 340—347)

ABSTRACT OF THE DISCLOSURE

This invention relates to analogue-to-digital converters for converting analogue signals to digital signals with high accuracy irrespective of whether the analogue signals are positive, negative or of a zero amplitude. The converter comprises pulse generating means responsive only to the analogue signal for generating a repetitive pulse signal whose repetition rate is proportional to the analogue amplitude. The pulse generating means includes amplitude level adjusting means for shifting the amplitude of the analogue signal. Gating means, responsive to a sampling control means, are provided to gate the pulse signals to counting means for indicating the polarity and amplitude of the analogue signal.

---

The primary object of the present invention is to provide an analogue-to-digital converter which can deal with the deflection component of digital pulse generator appropriately, and can convert analogue quantities to digital quantities accurately irrespective of whether the former quantities are plus or minus.

There are other objects and particularities of the present invention, which will be made obvious from the following detailed description, with reference to the accompanying drawings, in which.

Figure 1:
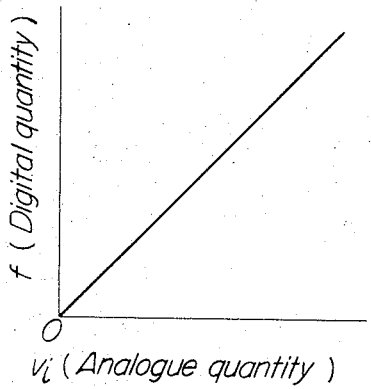
FIGS. 1 and 2 are input-output characteristic curve diagrams of digital pulse generators for use in analogue-to-digital converters.

Conventional counting type analogue-to-digital converters effect the conversion by counting the output pulses of digital pulse generators by means of ordinary counters, the pulse generators producing digital pulses in linear relations with respect to analogue quantities being converted. Such a system can directly operate the converter, if the zero points of analogue quantities and pulse numbers coincide with each other, as shown in FIG. 1. But in practice, digital pulse generators generally have poor linearity near the zero points of the analogue quantities, as shown in FIG. 2, and consequently, cannot generate pulses in proportion to the analogue quantities.

For example, converter circuits, in which transistors and transformers are utilized, can generate A.C. voltages having frequencies proportional to input D.C. voltages, and are employed as digital pulse generators, but the outputs are disadvantageously unstable near zero D.C. voltages. Such a converter circuit is advantageous in that it is simple in consrtuction and low in cost, but by virtue of the above-mentioned undersirable characteristic, it has limited utility.

Figure 2:
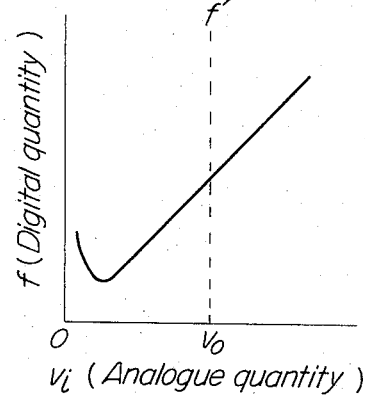

Generally speaking, when a converter shows non-linearity as mentioned above, it is used with its reference axis (ordinate) transferred to a suitable position $f'$, as shown in FIG. 2. In such a case, however, a deflection component is produced in the output by virtue of the displacement of the reference axis, and means should be provided for removing such a deflection component.

Further, in the hereinbefore described conventional digital type analogue-to-digital converters, conversion cannot be effected when analogue quantities are of minus values.

The present invention provides means to appropriately deal with the above-mentioned deflection component, and also to enable the converter to convert analogue quantities to digital quantities, even when the former have minus values.

Figure 3:
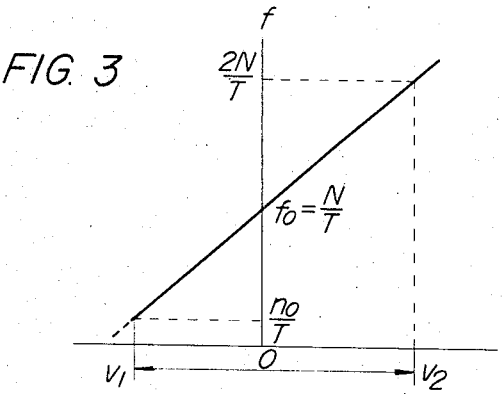
FIG. 3 is an input-output characteristic curve diagram of a digital pulse generator employed in the present invention.

Thus, the present invention is characterized by the fact that the input-output characteristic curve of the digital pulse generator is as shown in FIG. 3, and the generator is applicable to a counting type analogue-to-digital converter in which the analogue quantity may vary between plus and minus values. Additionally, a definite number of pulses (deflection amount) are produced even when the analogue quantity is zero. This corresponds to the fact that the reference axis has been transferred to position $f'$ in FIG. 2.

Figure 4:
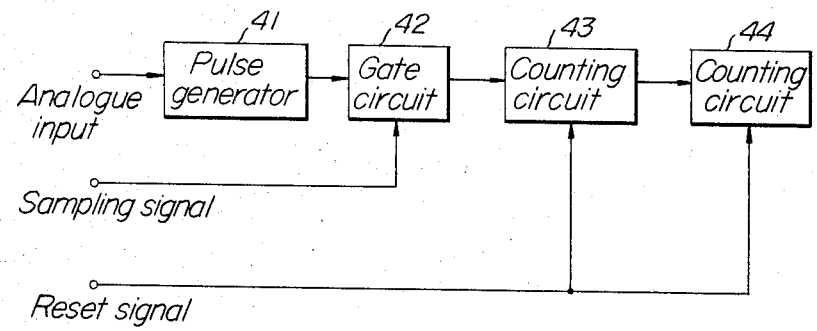
FIG. 4 is a block diagram of a counting type analogue-to-digital converter embodying the present invention.

Referring now to FIG. 4 showing the counting type analogue-to-digital converter embodying the present invention, the converter comprises a digital pulse generator 41, a gate circuit 42, and counting circuits 43 and 44.

The digital pulse generator 41 has input-output characteristics as shown in FIG. 3, and generates pulses of frequency proportional to the input analogue signal. Even when the analogue signal is zero, it generates pulses of definite frequency $f_0$. Particularly, according to the present invention, the above-mentioned definite frequency $f_0$ (deflection amount) is related to the sampling time T of gate circuit 42 and the count capacity N of counting circuit 43, as follows:

$$f_0 = \frac{N}{T}$$

By doing this, the deflection amount is dealt with appropriately. The range of variation of the analogue quantity is normally between $v_1$ and $v_2$, as seen in FIGURE 3, and the pulse generator 41 is biased so that the output frequencies are $n_0/T$ when the analogue quantity is $v_1$, and $2N/T$ when the analogue quantity is $v_2$.

The input-output characteristic curve of the digital pulse generator may be expressed by the following equations:

$$f = kv + f_0 = kv + \frac{N}{T} \tag{1}$$

$$\frac{n_0}{T} \leq f < \frac{2N}{T} \tag{2}$$

where $f$=output frequency of digital pulse generator.
$k$=conversion constant.
$N$=possible count capacity of counting circuit 43.
$n_0$=count value during sampling time T, when analogue quantity is $v_1$.
$T$=sampling time.

The gate circuit 42 is open for a definite period of time responsive to a sampling signal, and gates the output of digital pulse generator 41 to the counting circuit 43 which operates to count the output pulses of gate circuit 42. The output signal of counting circuit 43 may be a binary number, binary-coded decimal number, etc., anyone of which may be adopted according to necessity. The counting circuit 43 is such that, when it has counted N pulses (N is any desired plus integer), the count number returns to zero, and at the same time, it produces a carry signal. The counting circuit 44 counts carry signals, that is, counts how many carry signals have been generated from counting circuit 43.

In operation, before initiating a counting cycle, the count numbers of counting circuits 43 and 44 are set to zero by supplying reset signals thereto. To start the counting operation, gate circuit 42 is opened for a time T by application thereto of the sampling signal, which gates pulses from the digital pulse generator 41 to counting circuit 43. The relation between the number of pulses counted and the analogue input voltage is deduced from Equation 1 as follows:

$$n = \int_0^T k v_i dt + N = n_x + N \quad (3)$$

When the analogue voltage $v$ is not changed with reference to time, $$n = k v_i T + N \quad (4)$$

When the analogue voltage $v_i$ is of negative value, a carry signal is not sent out, and consequently, the count number of carry signal counter 44 is zero, while the count number of counting circuit 43 is the complement number of N. When the analogue input voltage $v_j$ is plus, and smaller than $v_2$, one carry pulse is sent out, and the count number of counting circuit 43 is $n_x$ which is proportional to the analogue input voltage. When the analogue input voltage is larger than $v_2$, two or more carry signals are sent out. In other words, according to the present invention, it is possible to determine whether the analogue input voltage is plus, minus, or overflowing.

In the foregoing explanation, it is assumed that $f_o$ is $N/T$, provided that $f_o$ is the output frequency when the analogue input voltage is zero, but similar results can be obtained when $f_o$ is $2N/T$, $3N/T$, and so on. This is accomplished simply by adjusting the characteristics of pulse generator 41 so that with zero signal at the analogue input the output frequency of the generator will be such as to produce N pulses over a period of time T, with N or multiples thereof being made the maximum or base count of counter 43.

Figure 5:
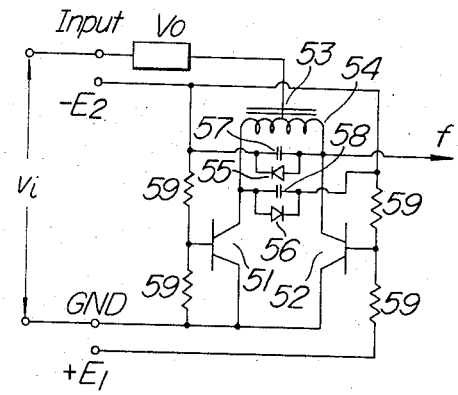
FIGS. 5, 6, 7 and 8 are circuit diagrams showing practical examples of essential parts of the invention, respectively.

FIG. 5 shows a practical example of a digital pulse generator used in the present invention, which comprises transistors 51 and 52, an iron core 53, a winding 54 wound thereon, diodes 55 and 56, condensors 57 and 58, and a resistor 59, forming a quasi-invertor circuit. Input analogue voltage $v_i$ is applied across input terminals INPUT and GND. The input circuit is provided with a source of deflection voltage $v_o$ connected in series between the ungrounded input side and iron core 53 for displacing the reference axis (see FIG. 2). The relation between analogue voltage $v_i$ and output frequency $f$ is shown by the following equation:

$$f = K(v_i + v_o)$$

where K is a proportion constant.

Figure 6:
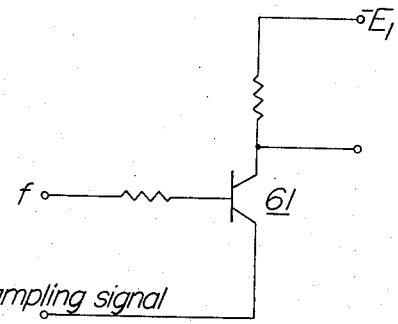

FIG. 6 shows a practical and simple example of a gate circuit which may be used in the invention, which comprises a transistor 61. Signals from the digital pulse generator of frequency $f$ are applied to the base electrode of the transistor, while sampling signals are applied to the emitter electrode of the same transistor. When the emitter gets earth potential (GND), the gate circuit is open, while when the emitter gets negative potential, the gate circuit is closed. The output of this gate circuit is supplied to the next stage counting circuit. The embodiment shown in FIGURE 6 illustrates a PNP type transistor. Those skilled in the art will recognize that a NPN type transistor may also be used with suitable alteration of the gate sampling signals.

Figure 7:
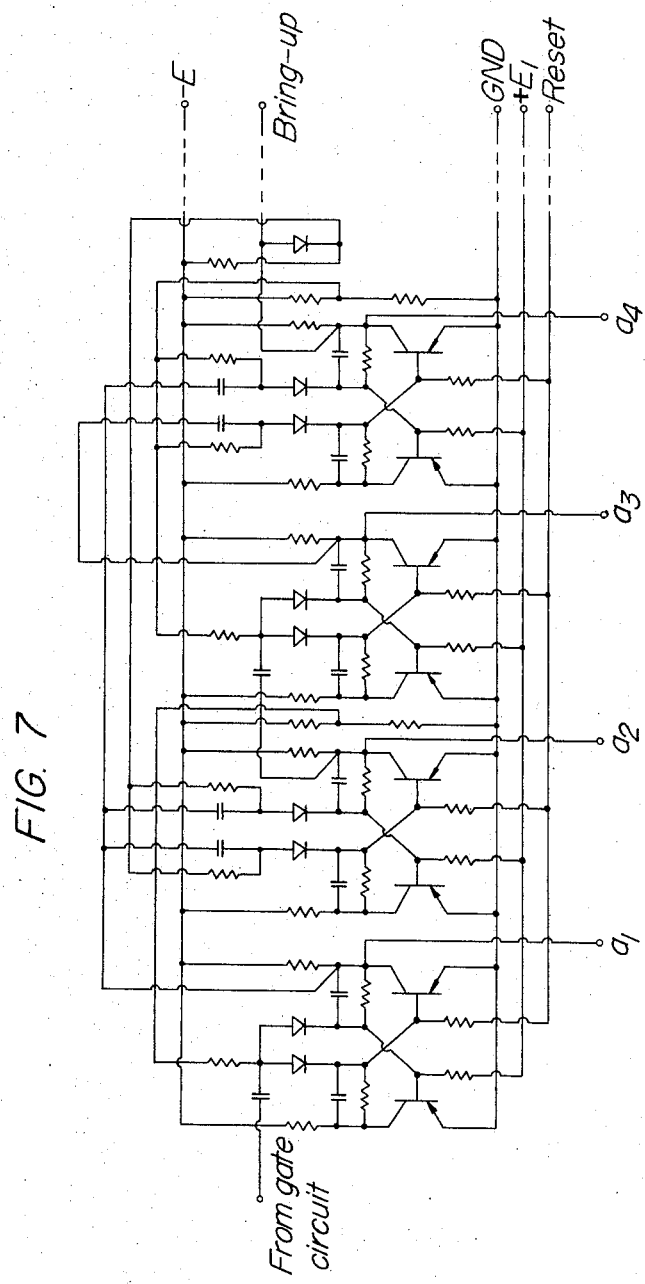

FIG. 7 shows a counting circuit 43 formed by flip-flop circuits, known per se, and provided with digital output terminals $a_1, a_2, a_3, a_4 \ldots$ . The counting circuit is reset by application of negative potential on the RESET terminal.

Figure 8:
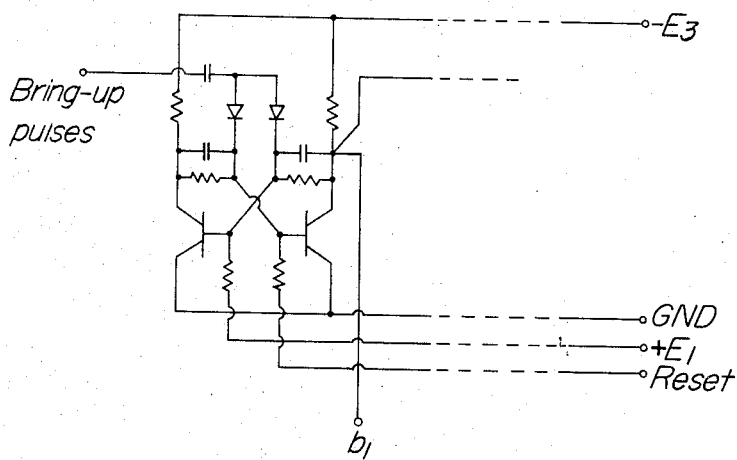

In FIG. 8 is shown a practical example of the counting circuit 44 for a single bit, for counting carry signals from counting circuit 43, and formed also by flip-flop circuits.

In the embodiment shown of the invention, when the analogue input voltage is zero, the frequency of digital pulse generator is 10 kc., and the sampling time is 0.1 second.

As is obvious from the foregoing description, the apparatus of the present invention is relatively simple in construction, and is able to convert analogue voltages to digital quantities with high accuracy, regardless of whether the analogue voltage is positive or negative.

Particularly, the apparatus of the present invention is adapted for use as the analogue-to-digital converter for data processing machine which scans a number of measurement points for supplying monitorial, printing, alarming, or other signals.

What I claim is:

1. An analogue-to-digital converter capable of determining both positive and negative amplitude of an analogue signal, in combination, comprising:
    pulse generating means responsive only to said analogue signal for generating a repetitive pulse signal, said pulse signal having a repetition rate proportional to the amplitude of said analogue signal,
    gating means for gating said pulse signal for a fixed period of time in response to a sampling control signal, and
    counting means connected to said gating means for counting the pulses in said pulse signal, said counting means having a base count equal to the number of pulses generated by said pulse generating means during said fixed period of time with said analogue signal equal to zero.

2. The analogue-to-digital converter according to claim 1, wherein said counting means includes means for detecting the number of times said base count is reached.

3. The analogue-to-digital converter according to claim 2, wherein said counting means includes first counting means for counting the pulses in said repetitive pulse signal, said first counting means generating at least one carry signal upon reaching said base count,
    and second counting means responsive to said first counting means for indicating the presence of said carry signal.

4. The analogue-to-digital converter according to claim 2, where said counting means includes first counting means for counting the pulses in said repetitive pulse signal, said first counting means generating at least one carry signal upon reaching said base count and initiating a new count in response thereto,
    second counting means responsive to said first counting means for indicating the presence and number of said carry signals,
    and means for resetting said first counting means and said second counting means by a reset signal prior to the initiation of a counting cycle.

5. An analogue-to-digital convertor capable of determining both positive and negative amplitudes of an analogue signal, in combination, comprising:
    pulse generating means responsive to said analogue signal for generating a repetitive pulse signal having a repetition rate proportional to the amplitude of said analogue signal, said pulse generating means generating a signal of frequency $f_o$ for a zero amplitude analogue signal,
    gating means connected to said pulse generating means for gating said pulse signal for a fixed period of time T in response to a sampling control signal,
    first counting means connected to said gating means having a maximum count of $$N = \frac{f_o}{T}$$

generating a carry signal and recycling each time said count of N is reached, and detecting means connected to said first counting means for detecting a carry signal therefrom.

6. The combination defined in claim 5 wherein said detecting means is a second counting means for detecting and counting said carry signals.

References Cited

Analog To Digital Converter by R. L. Taylor, IBM Technical Disclosure Bulletin, vol. 3, No. 10, March 1961, pp. 128–9.

DARYL W. COOK, *Acting Primary Examiner.*

W. J. KOPACZ, *Assistant Examiner.*